United States Patent [19]

Arrhenius et al.

[11] Patent Number: 4,503,838

[45] Date of Patent: Mar. 12, 1985

[54] LATENT HEAT STORAGE AND SUPPLY SYSTEM AND METHOD

[75] Inventors: Gustaf O. Arrhenius, La Jolla, Calif.; Michael L. Goldstein, Omaha, Nebr.; Candace X. Moore, San Diego, Calif.

[73] Assignee: American Hospital Supply Corporation, Evanston, Ill.

[21] Appl. No.: 418,213

[22] Filed: Sep. 15, 1982

[51] Int. Cl.³ .............................................. F24J 1/00
[52] U.S. Cl. ..................................... 126/263; 165/10; 252/70
[58] Field of Search ................... 126/263; 165/10, 1; 252/70

[56] References Cited

U.S. PATENT DOCUMENTS

| | | |
|---|---|---|
| 1,384,747 | 7/1921 | Eckelmann et al. |
| 1,433,010 | 10/1922 | Hogan |
| 1,915,523 | 6/1933 | Ferguson |
| 1,920,853 | 8/1933 | Ferguson ............................ 126/263 |
| 2,114,396 | 4/1938 | McFarlan et al. ................. 219/46 |
| 2,118,586 | 5/1938 | Bowles et al. ..................... 44/3 |
| 2,220,777 | 11/1940 | Othmer ............................ 126/204 |
| 2,289,425 | 7/1942 | Hogan ............................... 126/263 |
| 3,093,308 | 6/1963 | Snelling ........................... 236/1 |
| 3,720,198 | 3/1973 | Laing et al. ....................... 126/400 |
| 3,951,127 | 4/1976 | Watson et al. ................... 126/263 |
| 4,077,390 | 3/1978 | Stanley et al. .................... 126/263 |

FOREIGN PATENT DOCUMENTS 2448739 9/1976 Fed. Rep. of Germany .
14173 2/1978 Japan .

*Primary Examiner*—Albert W. Davis, Jr.
*Attorney, Agent, or Firm*—Brown, Martin & Haller

[57] ABSTRACT

Latent heat storage and supply system and method in which a body of crystallizable phase change material and a separate body of a special crystallization nucleator for the phase change material are associated for heating as a unit to melt the phase change material, for cooling to bring the molten phase change material to supercooled condition in which heat is stored as latent heat of crystallization and thereafter for transferring a controlled portion of the nucleator into the body of phase change material to induce crystallization and release of latent heat of crystallization. The special nucleator includes a component which, after the heating and cooling steps, will contain crystals for nucleating the phase change material and which has a solubility in the phase change material such that the controlled portion added to the body of phase change material will dissolve in that body during the heating step.

24 Claims, 2 Drawing Figures

LATENT HEAT STORAGE AND SUPPLY SYSTEM AND METHOD

FIELD OF THE INVENTION

The present invention relates to a latent heat storage and supply system and method and particularly to a unitary recyclable system and method.

BACKGROUND OF THE INVENTION

Portable heat storage units have gained wide acceptance for therapeutic purposes and for a wide variety of applications that call for heat on demand. For this use phase change materials which give off heat in changing from supercooled liquid form to crystalline state have been found particularly useful since they give off heat at a predetermined and constant temperature during the time of application which may be several hours.

Reliable heat storage requires that the supercooled condition be stable for extended periods; but this stability in turn creates difficulties in initiating crystallization. For example, sodium thiosulfate pentahydrate, hereafter referred to as STP, has a uniquely high tendency to remain in supercooled liquid form for practically indefinite time at room temperature and has a large heat of fusion in latent form. Because of the unusually large activation energy necessary for nucleation and because of the low symmetry of the crystals, it has, up to the present, required crystals of the substance itself as seed for epitactic nucleation and growth.

Nucleation of such materials can also be induced by surface energy in the form of dislocations and surface charge on a variety of materials when they are in active state. Thus, STP has been nucleated by this procedure by sodium tetraborate decahydrate and sodium sulfite heptahydrate. However, if such substances, as is necessary in the case of recyclable systems, are heated together with the phase change material, such agents consistently lose their nucleating power and do not regain their active state unless they are exposed to the atmosphere and in some cases reactivated by grinding or other means.

SUMMARY OF THE INVENTION

It is an object of the present invention to provide a unitary closed heat storage system and method which enables the phase change material to be recycled a large number of times by heating the whole system to temperatures effective to melt the phase change material or even to heat sterilization temperatures.

In the recyclable latent heat storage and supply system and method of the present invention, a body of fusible, readily supercooled phase change material is disposed in one chamber of a closed container and in a second chamber there is disposed a body of a special nucleator providing, after the system is heated to melt and cooled to supercooled liquid condition, crystals for nucleation. This special nucleator is a flowable, usually slushy composition of a selected salt or salts and a solvent in proportions such that the heat of the recharging step does not destroy the ability of the composition when cooled, spontaneously to reform crystals effective to initiate crystallization of the phase change material. A further necessary property of the nucleator is that the added nucleator is soluble in the phase change material during the heating stage and loses its nucleating ability. To initiate crystallization, a controlled portion of the nucleator is moved from the body of the nucleator and introduced into the body of phase change material in a manner to insure that the main body of nucleator remains separate from the phase change material during the heating step.

DETAILED DESCRIPTION OF THE INVENTION

Figure 1:
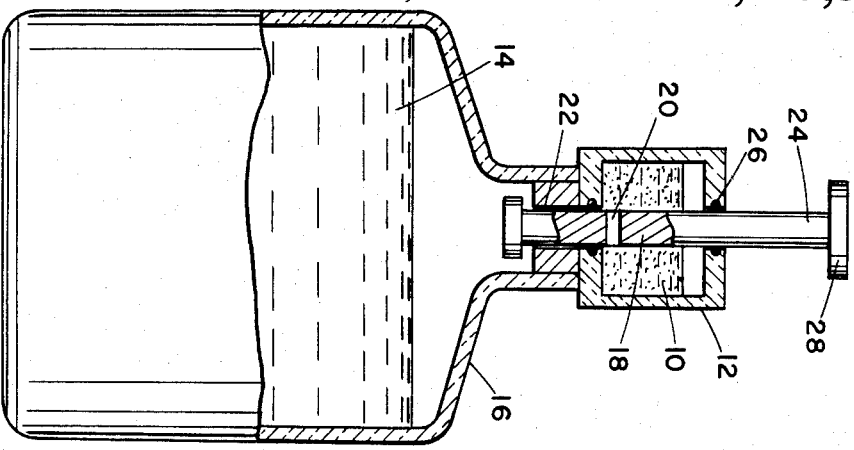
FIG. 1 is a plan view with parts broken away of one form of apparatus useful in the heat storage and supply system and method of the present invention.

The unitary recyclable latent heat storage and supply system and method of the present invention provide a unique combination of a body of primary phase change material, which will be referred to as PCM, which when heated to melt it and then cooled forms a stable supercooled liquid and a separate body of secondary material, the nucleator associated with the first body, which, even after being subjected to the heating required to melt the PCM, provides crystals having a character relative to crystals of the PCM, for inducing crystallization of and liberation of latent heat from the body of supercooled PCM.

Preservation of the ability of the nucleator to supply seed crystals requires that the nucleator be maintained as a body separate from the body of PCM during heating to recharge the PCM. In the device shown in FIG. 1, the body 10 of nucleator is held in a reservoir compartment 12 separate from the body 14 of PCM in the main chamber 16 of the device. A rod 18 formed with an opening 20 transverse to the axis of the rod 18 is slidably disposed in and seals the channel 22 extending between the compartment 12 and the main chamber 16 of the device. In the rod position shown, the opening 20 in the rod 18 is immersed in the body 10 of nucleator to take up a controlled portion of the nucleator. An end 24 of the rod extends out through a gland 26 in the compartment 12 and is provided with a knob or button 28 for moving the rod 18 to a position in which the opening 20 in the rod is within the main chamber 16 to carry the controlled portion of the nucleator into the body 14 of PCM. The device is constructed to supply at each stroke of the rod 18 a controlled quantity of nucleator capable of nucleating the supercooled PCM, but small enough so that when the device is reheated to recharge the PCM, the nucleator introduced dissolves and loses its ability to nucleate the PCM. In moving to bring the opening 20 from the chamber 16 to the compartment 12, PCM is carried into the body 10 of nucleator, but the amount is so small that it does not change the properties of the nucleator for a reasonable number of cycles, e.g., 100.

Other devices for transferring a controlled portion of nucleator may be used, such as a device (not shown) having a flexible main container holding the PCM and having a series of rupturable sacs within the container, each of which holds a controlled portion of nucleator which may be released by rupturing the sac. It is preferred that these devices be non-metallic to enable convenient heating in a microwave oven.

Phase change materials, PCM, for use in the present system and method are normally crystalline materials, particularly salt hydrates, which are fusible by heat and which readily supercool from molten condition to metastable liquid condition. It is important that the PCM be capable of reliable nucleation when it is desired to liberate latent heat of crystallization from the system; but it is also important that the PCM have a large activation energy for nucleation to avoid spontaneous crystallization from supercooled condition. Other factors considered in selecting a PCM for use in the system and method include the crystallization temperature suitable for the intended use and a high latent heat of crystallization. Materials which may be used as PCM include sodium thiosulfate pentahydrate (STP), sodium acetate trihydrate (SAT), disodium hydrogen phosphate dodecahydrate, (DHPDo), lithium nitrate trihydrate (LNT) alone or in appropriate mixtures. A particularly useful PCM is solution of STP in SAT on the sodium acetate rich side of the STP-SAT eutectic (see FIG. 2) together with a small addition of a protic solvent such as water in which the STP and SAT are preferably in relative proportions to provide the desired heat release temperature. A useful composition may comprise 59.2 weight % of SAT 36.0% of STP and 4.8% of water to provide a heat release temperature of $\leq 50°$ C. In these peritectic proportions, it is found that complete thermodynamic reversibility is secured and that no undesirable metastable phases, such as sodium acetate anhydrate or sodium thiosulfate dihydrate crystallize. The amount of SAT-STP remaining in solution at the terminally useful temperature, i.e., about 36° C. is as low as a few mass percent of the total amount in the system and the loss of latent heat storage capacity arising from the addition of excess water to reach the peritectic point is negligible.

The nucleator in the present system and method operates to provide nucleating crystals even after being subjected to recharging temperatures through balancing the relative amount of solvated crystals for nucleating a crystallizable component of the PCM, and unsolvated or lower solvate crystals, against the amount of free and bound solvent present in the body of nucleator.

Figure 2:
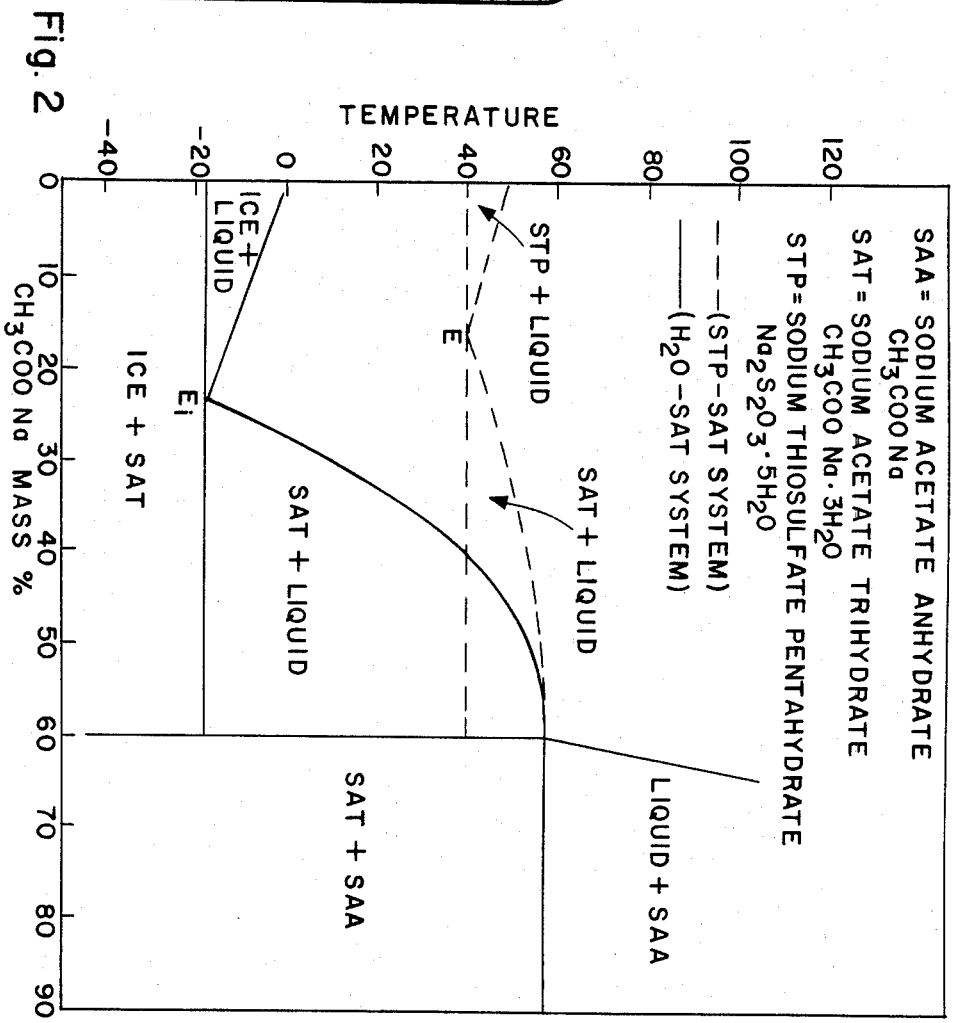
FIG. 2 is a combined phase diagram of the system sodium acetate trihydrate-sodium acetate anhydrate and the system sodium acetate trihydrate-sodium thiosulfate pentahydrate.

Thus, referring to the phase diagram, FIG. 2, it can be seen that when anhydrous sodium acetate (SAA) comprises more than 60 weight percent of an SAA/water system, and a hot saturated solution in this compositional range is cooled below 58° C., the resulting solid will be a mixture of SAA and SAT. The solid SAA effectively prevents supercooling of the SAT in this binary system and unlike pure SAT, the solid will not completely dissolve near the PCM charging temperature. In fact, the temperature at which complete dissolution takes place can be controlled by adjusting the SAA/water ratio as indicated by the liquidus curve "L" (SAA) in the phase diagram. The crystalline SAT forming from this solution when it cools can in turn be used to nucleate a supercooled PCM based on SAT. On heating the recharge the PCM, the SAT in the seed reservoir dissolves in its water of crystallization, but, on cooling, this water again recombines with the residual SAA to form fresh crystals of SAT. The minute amount of seed material which had been transferred to the body of PCM dissolves completely in the PCM when the system is heated to recharge it.

Water is the usual and most practical solvent and in the following description, the system will be described as it relates to water, hydrates and anhydrates. In the balanced nucleator composition, total free and bound water is less than that which would dissolve completely the existing anhydrate or lower hydrate and the anhydrate or lower hydrate formed by loss of water and hydration from the hydrate at recharging temperature. The undissolved anhydrate or lower hydrate crystals remaining in the body of nucleator after heating the system to recharge it serve to initiate crystallization of the hydrate as that is reconstituted when the system is cooled after recharging and are available for introduction into the body of supercooled PCM when it is desired to liberate latent heat from the PCM.

Materials useful in the nucleator are those providing a crystal having a character which will initiate crystallization of the PCM to liberate latent heat. Such materials in the present invention are usually mixtures of a hydrate crystal of a crystallizable component of the PCM and a lower hydrate or anhydrate of that component, e.g., a mixture of sodium acetate trihydrate (SAT) and sodium acetate anhydrate (SAA) for initiating crystallization of a supercooled solution of SAT, a mixture of disodium hydrogen phosphate dodecahydrate (DHPDo) and disodium hydrogen phosphate dihydrate (DHPDi) for initiating crystallization of a supercooled solution of DHPDo, or a mixture of lithium nitrate trihydrate (LNT) and lithium nitrate hemihydrate (LNH) for initiating crystallization of a supercooled solution of LNT.

The amount of free and bound water or other solvent employed in the nucleator is of course determined by the solvation and solubility properties of the compounds used. For SAT-SAA, it may be from about 10% to about 40% calculated on the weight of the anhydrate while for PHPDo-DHPDi a mixture of these in the ratio of 1 to 2, and, for a mixture of LNH and LNT in the ratio of 3 to 1.

For practical reasons, it is desirable, in many instances, that the nucleator be in a form in which it can be transported easily in controlled amounts from the body of nucleator to the body of supercooled PCM. Solid crystalline salt hydrates, even those which have a fairly high melting point tend to sinter into a cohesive mass in the body of nucleator, on heating to charging temperature. To avoid this difficulty, the crystalline nucleator material may be suspended in a liquid which is miscible with or soluble in the PCM when the system is activated in order to insure effective contact between the suspended nucleating solid and the supercooled PCM. In addition, the seed material must be stable against deleterious dissolution or decomposition in the transfer liquid over this temperature range. Useful suspension liquids for hydrate crystals include various diols and polyols, such as ethylene glycol, propylene glycol and glycerol, $C_1$ to $C_5$ monohydric alcohols, ketones and ethers. Provided enough of the liquid is used to give the desired fluidity, the amount of liquid is not particularly critical. In some cases, compounds are formed between the salts and the nonhydrous suspension liquid. Sodium acetate for example is found to form one or several crystalline phases with ethylene glycol. In such cases, the amount of suspension liquid should not be so large that the concurrent formation of the nucleating phase is suppressed. This level is, however, for all useful suspension liquids considerably in excess of the amount needed to achieve suspension. It has been found for example that a suspension comprising about one-third of ethylene glycol based on the entire composition provides a desirable suspension in which the crystalline phases form a soft fluid mush.

In an alternative nucleator composition, monohydric alcohols, ketones and ethers, such as diethylene glycol dimethyl ether, having at least 6 carbon atoms in the molecules may be added to the PCM. Nucleator compositions including these materials may be solids and likewise provide effective nucleating crystals after having been subjected to heating to charging temperature.

In a system in which the PCM is a mixture of a difficulty crystallizable component and a more easily crystallizable component having related crystal properties, such as a mixture of SAT and STP in proportion on the SAT side of the eutectic mixture, a special nucleation action is effected by the introduction of a nucleator crystal for the more easily crystallizable component. The surface energy of the growing crystals induced in the more easily crystallizable component in turn provide the activation energy for nucleation of the more difficulty crystallizable component. For example, in the supercooled SAT-STP system, introduction of SAT crystals initiates crystallization of the SAT in the PCM and the rapidly growing SAT crystals provide sufficient surface energy to initiate crystallization of the STP so that thereafter there is concurrent crystallization and evolution of latent heat of crystallization from both the SAT and the STP in the supercooled PCM.

The following examples are provided to aid in understanding the invention and it is to be understood that the invention is not limited to the particular materials, proportions, temperatures and other details of the examples.

EXAMPLE 1

A phase change material, PCM, constituted of 177.6 grams of sodium acetate trihydrate (SAT), 108 grams of sodium thiosulfate pentahydrate (STP) and 14.4 grams of water is placed in the chamber 16 provided with a nucleation mechanism as shown in FIG. 1. In the reservoir compartment 12 of this device is placed a body 10 of nucleator formed of 4.5 grams of sodium acetate anhydrate (SAA), 0.5 grams of water and 5.0 grams of ethylene glycol. The entire apparatus is heated in a microwave oven until the temperature in the PCM reaches 65° C., whereupon the unit is allowed to cool to room temperature. In this stage, the PCM is a supercooled liquid and the nucleator is a slush containing SAT crystals. One day later, the PCM is nucleated by operating the rod 18 in the apparatus to bring a controlled portion of nucleator from the reservoir 12 and introduce it into the PCM in the chamber 16. At this point, nucleation of the PCM immediately takes place by formation of a cluster of acicular SAT crystals growing from the nucleation suspension introduced by the piston. Shaking of the unit rapidly leads to the formation of a swarm of seed crystals of SAT and STP throughout the medium. Crystallization leads to the release of the heat of crystallization and rapid rise of the temperature until the PCM reaches the liquidus temperature of 50° C., from which it slowly recedes to 40° C., the eutectic temperature. After completion of this main phase of crystallization, the temperature falls more rapidly to ambient while the PCM gives up sensible heat and a small amount of latent heat from additional crystallization of salt hydrates dissolved in the added water.

Thereafter, the entire apparatus is again heated to 65° C. and allowed to cool. The PCM again becomes a supercooled liquid and the nucleator forms a slush containing SAT crystals. The PCM is nucleated by operation of the rod 18 to introduce SAT crystals from the reservoir 12 into the body 14 of PCM in the chamber 16. Crystallization of the PCM and the release of the heat of crystallization occurs as before.

The cycle of heating, cooling and nucleation may be repeated a substantial number of times.

EXAMPLE 2

The procedure of Example 1 is carried out using as PCM a mixture of 45% SAT, 4.5% water and 50.5% STP, the percentages being by weight, and to this mixture is added 3% of glycerol by weight based on the weight of the mixture. This mixture had a crystallization peak temperature of 44° C. and the addition of the glycerol causes the crystalline aggregate to be soft and pliable.

The nucleator in this example is a mixture of 45% SAA, 15% water and 40% glycerol by weight.

Melting, supercooling, nucleation and crystallization with release of heat after the introduction of the nucleator occur as in Example 1 and the cycle is repeatable.

EXAMPLE 3

In this example, the PCM is a mixture of 200 grams of disodium hydrogen phosphate dodecahydrate (DHPD), 9 grams of water and 3 grams of glycerol and the nucleator is a mixture of 1.2 grams of DHPD, 2.6 grams of disodium hydrogen phosphate dihydrate and 2 grams of ethylene glycol.

These materials are placed respectively in the container and the reservoir of the apparatus shown in FIG. 1 and the combined apparatus is heated in a microwave oven until the temperature reaches the melting point 36° C. of the PCM. The apparatus is allowed to cool to room temperature where the PCM becomes a supercooled liquid and the nucleator forms a slush containing DHPD crystals. One day later, the PCM is nucleated by operation of the piston and releases the heat of crystallization with rapid rise of temperature until the PCM reaches the liquidus temperature.

The cycle of heating, cooling and nucleation for release of heat may be repeated a substantial number of times.

EXAMPLE 4

In this example, the PCM is a mixture of 250 grams of lithium nitrate trihydrate, 12 grams of water and 6.5 grams of glycerol. The nucleator is a mixture of 2.2 grams of lithium nitrate hemihydrate, 0.8 grams of lithium nitrate and 3.1 grams of propylene glycol. These materials are placed respectively in the container and in the reservoir of the apparatus shown in FIG. 1 and the entire apparatus is heated in a microwave oven until the temperature reaches the melting point 28° C. of the PCM. The apparatus is allowed to cool and the PCM becomes a supercooled liquid and the nucleator forms a slush containing lithium nitrate trihydrate crystals. Later, this unit was nucleated by operation of the piston to initiate crystallization and release heat of crystallization from the PCM. The unit may be recycled.

EXAMPLE 5

A PCM composed of 320 grams of the mixture of SAT, STP, water and glycerol in the proportions used in Example 2, is disposed in a breakable plastic bag and the bag is disposed in an outer sealed bag containing 0.05 grams of a solid nucleating agent, consisting of 21% SAT, 34% SAA and 45% of diethylene glycol dimethyl ether. The composite is heated for one hour in an oven at 65° C. to melt the PCM, the nucleating agent remaining largely solid with a small amount of capillarily held liquid. The composite is cooled and the PCM in the breakable bag forms a supercooled liquid. After keeping at room temperature for one week, the seal of the inner bag is ruptured to bring the liquid supercooled PCM into contact with the nucleator. Nucleation is immediate and is spread rapidly through the PCM by agitation of the composite.

After evolution of heat from the composite, the entire composite is reheated for one hour at 65° C. to melt the PCM. On cooling, the PCM remained in liquid supercooled condition.

We claim:

1. Unitary latent heat storage and supply system comprising a closed container, a body of crystallized phase change material (PCM) in a first chamber of said container, a body of nucleator for said PCM in a separate chamber of said container, means to introduce a controlled portion of said nucleator from said second chamber into the body of PCM in said first chamber to initiate crystallization of and supply of heat from said body of PCM, said PCM comprising a fusible readily supercooled component for storage of heat and of liberation of latent heat of crystallization, said nucleator comprising a salt which in solvated crystal form will nucleate and induce crystallization of a PCM component from supercooled condition, unsolvated or lower solvated crystals of said salt and an amount of free and bound solvent less than that which would dissolve completely the existing unsolvated or lower solvated salt crystals and unsolvated or lower solvated salt crystals formed by desolvation of said solvated salt crystals at recharging temperature, whereby portions of unsolvated or lower solvated crystals not dissolved by said solvent at recharging temperature remain to induce crystallization in said body of nucleator after said system has been heated to melt said PCM and cooled to supercool the PCM and said portion of nucleator introduced into the body of PCM being soluble in molten PCM at temperature reached during the recharging heating step to the extent that it loses its nucleating ability.

2. The system as defined in claim 1 in which said solvated salt is a salt hydrate and said solvent is water.

3. The system as defined in claim 2 in which said salt crystals are suspended as a slush in a liquid which is miscible with or soluble in said PCM.

4. The system as defined in claim 3 in which said liquid is a member of the group consisting of ethylene glycol, propylene glycol, glycerol, $C_1$ to $C_5$ monohydric alcohols, ketones and ethers.

5. The system as defined in claim 4 in which the solvated salt crystals contain an adduct of the salt and said suspension liquid.

6. The system as defined in claim 2 in which the amount of liquid formed at recharging temperature is small enough that the nucleator remains largely solid and immobile.

7. The system as defined in claim 6 in which said liquid comprises a monohydric alcohol, ketone or ether, having at least 6 carbon atoms.

8. The system as defined in claim 4 in which said PCM comprises the same salt hydrate forming part of said nucleator.

9. The system as defined in claim 1 in which said PCM comprises a mixture of at least two readily supercooled components, one of said PCM components being more resistant to crystallization than a second PCM component and having a crystal structure related to the crystal structure of said second PCM component such that it is capable of nucleation by surface energy developed in crystallization of said second component.

10. The system as defined in claim 2 in which said PCM is a mixture of sodium acetate trihydrate and sodium thiosulfate pentahydrate in relative proportions on the sodium acetate rich side of the eutectic and in which said nucleator comprises crystals of sodium acetate trihydrate and sodium acetate anhydrate.

11. The system as defined in claim 2 in which said PCM comprises disodium hydrogen phosphate dodecahydrate and said nucleator comprises crystals of disodium hydrogen phosphate dodecahydrate and disodium hydrogen phosphate dihydrate.

12. The system as defined in claim 2 in which said PCM comprises lithium nitrate trihydrate and said nucleator comprises crystals of lithium nitrate trihydrate and lithium nitrate hemihydrate.

13. Unitary latent heat storage and supply method comprising heating both a body of crystallizable phase change material (PCM) and an associated but separate body of nucleator to a temperature sufficient to melt the PCM, cooling said bodies to bring the PCM to supercooled condition for storage of heat as latent heat of crystallization, said nucleator comprising:
    a salt which in solvated crystal form will nucleate and induce crystallization of said supercooled PCM from supercooled condition;
    unsolvated or lower solvated crystals of said salt; and
    an amount of free and bound solvent less than that which would dissolve completely the existing unsolvated or lower solvated salt crystals and unsolvated or lower solvated salt crystals formed by desolvation of said solvated salt crystals at recharging temperature, whereby portions of unsolvated or lower solvated crystals not dissolved by said solvent at recharging temperature remain to induce crystallization in said body of nucleator after said bodies have been heated and cooled, introducing a controlled portion of said nucleator into said body of PCM to initiate crystallization of and supply of latent heat of crystallization from said body of PCM, reheating both of said bodies after crystallization of and delivery of heat from said body of PCM to remelt said PCM for storage of heat, said introduced portion of nucleator being soluble in the body of molten PCM during said reheating to the extent that the introduced portion of nucleator looses its nucleating ability, and cooling said bodies to bring the PCM to supercooled condition.

14. The method as defined in claim 14 in which said solvated salt is a salt hydrate and said solvent is water.

15. The method as defined in claim 14 in which said salt crystals are suspended as a slush in a liquid which is miscible with or soluble in said PCM.

16. The method as defined in claim 15 in which said liquid is a member of the group consisting of ethylene glycol, propylene glycol, glycerol, $C_6$ to $C_{10}$ monohydric alcohols, ketones and ethers.

17. The method as defined in claim 16 in which the solvated salt crystals contain an adduct of the salt and said suspension liquid.

18. The method as defined in claim 16 in which the amount of liquid formed at recharging temperature is small enough that the nucleator remains largely solid and immobile.

19. The method as defined in claim 18 in which said liquid comprises a monohydric alcohol, ketone or ether, having at least 6 carbon atoms.

20. The method as defined in claim 16 in which said PCM comprises the same salt hydrate forming part of said nucleator.

21. The method as defined in claim 13 in which said PCM comprises a mixture of at least two readily supercooled components, one of said PCM components being more resistant to crystallization than a second PCM component and having a crystal structure related to the crystal structure of said second PCM component such that it is capable of nucleation by surface energy developed in crystallization of said second component.

22. The method as defined in claim 14 in which said PCM is a mixture of sodium acetate trihydrate and sodium thiosulfate pentahydrate in relative proportions on the sodium acetate rich side of the eutectic and in which said nucleator comprises crystals of sodium acetate trihydrate and sodium acetate anhydrate.

23. The method as defined in claim 14 in which said PCM comprises disodium hydrogen phosphate dodecahydrate and said nucleator comprises crystals of disodium hydrogen phosphate dodecahydrate and disodium hydrogen phosphate dihydrate.

24. The method as defined in claim 14 in which said PCM comprises lithium nitrate trihydrate and said nucleator comprises crystals of lithium nitrate trihydrate and lithium nitrate hemihydrate.

* * * * *

UNITED STATES PATENT AND TRADEMARK OFFICE
CERTIFICATE OF CORRECTION

PATENT NO. : 4,503,838
DATED : March 12, 1985
INVENTOR(S) : GUSTAF O. ARRHENIUS, MICHAEL L. GOLDSTEIN and
CANDACE X. MOORE It is certified that error appears in the above-identified patent and that said Letters Patent are hereby corrected as shown below:

Column 8, line 52, Claim 14, change "14" to --13--.

Column 8, line 65, Claim 18, change "16" to --14--.

Signed and Sealed this

Thirtieth Day of July 1985

[SEAL]

Attest:

DONALD J. QUIGG

Attesting Officer

Acting Commissioner of Patents and Trademarks